(12) United States Patent
Kim

(10) Patent No.: US 7,140,750 B2  
(45) Date of Patent: Nov. 28, 2006

(54) LIGHT SOURCE ASSEMBLY, BACKLIGHT ASSEMBLY AND LIQUID CRYSTAL DISPLAY APPARATUS HAVING THE SAME

(75) Inventor: Yong-Il Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 182 days.

(21) Appl. No.: 10/845,845

(22) Filed: May 14, 2004

(65) Prior Publication Data

US 2004/0264198 A1 Dec. 30, 2004

(30) Foreign Application Priority Data

Jun. 26, 2003 (KR) .................. 10-2003-0042006

(51) Int. Cl.
*F21V 7/20* (2006.01)

(52) U.S. Cl. .................. 362/218; 362/225; 362/614; 362/615

(58) Field of Classification Search ................ 362/225, 362/218, 615, 614

See application file for complete search history.

(56) References Cited

U.S. PATENT DOCUMENTS 6,960,001 B1 * 11/2005 Nitto et al. .................. 362/218

* cited by examiner

*Primary Examiner*—Alan Cariaso  
*Assistant Examiner*—Leah S. Lovell  
(74) *Attorney, Agent, or Firm*—Cantor Colburn LLP (57) ABSTRACT

A light source assembly includes a heat interception portion disposed between a light source unit and an optical member. The heat interception portion may be extended from the light source unit. Alternatively, the heat interception portion may be extended from a receiving container that receives the light source unit and the optical member. The heat transferred from the light source unit to the optical member may be reduced. Thus, deformation of the optical member may be prevented and the display quality of the image from the liquid crystal display apparatus using the light source assembly may be improved.

16 Claims, 12 Drawing Sheets

LIGHT SOURCE ASSEMBLY, BACKLIGHT ASSEMBLY AND LIQUID CRYSTAL DISPLAY APPARATUS HAVING THE SAME

CROSS-REFERENCE TO RELATED APPLICATIONS

This application relies for priority upon Korean Patent Application No. 2003-42006 filed on Jun. 26, 2003, the contents of which are herein incorporated by reference in its entirety.

BACKGROUND OF THE INVENTION

1. Field of the Invention

The present invention relates to a light source assembly, a backlight assembly having the light source assembly and a liquid crystal display apparatus having the light source assembly. More particularly, the present invention relates to a light source assembly that emits a heat generated in a light source unit, a backlight assembly having the light source assembly and a liquid crystal display apparatus having the light source assembly.

2. Description of the Related Art

Generally, liquid crystal has a physical property of interstate that is between solid state and liquid state. The arrangement of the liquid crystal is changed in accordance with the direction of electric field applied thereto, and then the light transmittance of the liquid crystal varies in accordance with the liquid crystal arrangement.

A liquid crystal display (LCD) apparatus displays an image containing information by adjusting the arrangement of the liquid crystal. The LCD apparatus is generally light and thin, and may be employed in various fields such as a notebook computer, a mobile telecommunication device or a liquid crystal television receiver, etc.

The LCD apparatus has a liquid crystal controlling part and a light supply part. The liquid crystal controlling part controls the arrangement of the liquid crystal, and the light supply part provides a light to the liquid crystal of the liquid crystal controlling part.

The liquid crystal controlling part generally includes a first substrate having a pixel electrode, a second substrate having a common electrode, and a liquid crystal layer interposed between the first and second substrates. The liquid crystal controlling part has a plurality of pixel electrodes in accordance with resolution of the liquid crystal display apparatus, and one common electrode corresponding the pixel electrodes. Each of the pixel electrodes is electrically connected to a thin film transistor, and a reference voltage is applied to the common electrode. The pixel electrode and the common electrode are generally transparent when the liquid crystal display apparatus has a light supply part.

The light supply part provides a light to the liquid crystal layer. The light passes through the pixel electrode, the liquid crystal layer and the common electrode. The quality of an image from the light controlling part depends on the brightness and brightness uniformity of the light supply part. As the brightness and the brightness uniformity of the light from the light supply part increase, the quality of the image is improved.

A conventional light supply part includes a cold cathode fluorescent lamp (CCFL) having a cylindrical shape. The CCFL has relatively high brightness and long lifetime. Further, the CCFL generates little heat compared to an incandescent lamp. Although the CCFL generates less heat than that of the incandescent lamp, the heat may induce problems.

Surface temperatures of the CCFL in the conventional liquid crystal display apparatus are shown in Table 1 below.

TABLE 1

| Surface Temperatures of the CCFL in Conventional LCD Apparatus | | | | | | |
|---|---|---|---|---|---|---|
| Lamp current (mA) | 4.0 | 4.5 | 5.0 | 5.5 | 6.0 | 6.45 |
| Lamp temperature (° C.) | 90 | 93.5 | 97.6 | 102 | 106.9 | 111.2 |
| Holder temperature (° C.) | 81.6 | 84.7 | 88.5 | 92.3 | 96.5 | 100.2 |

In the conventional CCFL, light intensity increases in proportional to the lamp current. In addition, the surface temperatures of the holder and the lamp increase in proportional to the lamp current. In Table 1, when the CCFL has a lamp current of 6.45 mA, the lamp has a surface temperature of 111.2° C. and the holder has a surface temperature of 100.2° C.

Since the holder undergoes a deformation at a temperature greater than about 240° C., the holder may not be damaged by the lamp current of about 6.45 mA. However, an optical member that is in contact with the holder such as a light guide plate may be deformed or damaged at a temperature greater than about 100° C. Additionally, optical sheets disposed on the light guide plate may also be deformed or adhere to a light guide plate at a temperature greater than about 100° C.

The heat generated in the CCFL may deform optical members such as light guide plate or an optical sheet. The heat also liquidizes the liquid crystal in the LCD panel, thereby deteriorating the displaying quality of the LCD apparatus.

SUMMARY OF THE INVENTION

The present invention is provided to substantially obviate one or more problems due to limitations and disadvantages of the related art.

The present invention provides light source assembly that emits a heat generated together with a light to reduce damage on an optical member.

The present invention also provides a backlight assembly having the light source assembly.

The present invention also provides a liquid crystal display (LCD) apparatus having the light source assembly.

According to an exemplary light guide assembly of the present invention, the light source assembly includes a light source unit, a holder and a reflection cover. The light source unit includes a light source body, a fluorescent layer and an electrode part. The light source body has a discharge space that contains discharge gas to generate a non-visible light. The fluorescent layer is formed on an inner surface of the light source body, and converts the non-visible light into a visible light. The electrode part transfers a discharge voltage to the light source body. The holder fixes the light source unit, and the reflection cover includes a reflection portion that reflects the visible light and a heat intercepting portion thermally connected to the reflection portion. The heat intercepting portion intercepts heat of the holder to transfer the heat to the reflection cover that emits the heat.

According to an exemplary backlight assembly of the present invention, the backlight assembly includes a light source assembly, an optical member and a first container. The light source assembly includes a light source unit, a holder and a reflection cover. The light source unit generates a light, and the holder fixes the light source unit. The reflection cover covers the light source unit and the holder to collect a light irradiated from the light source unit and to exit the collected light. The optical member is disposed in substantially parallel with the light source assembly. The optical member receives the exited light and changes an optical distribution of the light. The first container includes a receiving body and a heat intercepting portion. The receiving body receives the light source assembly and the optical member. The heat intercepting portion is extended from the receiving body to be interposed between the holder and the optical member.

According to an exemplary LCD apparatus of the present invention, the LCD apparatus includes a light source assembly, an optical member, a first container and an LCD panel. The light source assembly includes a light source unit, a holder and a reflection cover. The light source unit generates a light, and the holder fixes the light source unit. The reflection cover covers the light source unit and the holder to collect a light irradiated from the light source unit and to exit the collected light. The optical member is disposed in substantially parallel with the light source assembly, and the optical member receives the exited light and changes an optical distribution of the light. The first container includes a receiving body and a heat intercepting portion. The receiving body receives the light source assembly and the optical member. The heat intercepting portion is extended from the receiving body to be interposed between the holder and the optical member. The liquid crystal display panel is disposed in the first receiving container, and the liquid crystal display panel converts the light into an image including information.

According to the present invention, the heat generated in the light source unit is transferred to the light emission portion disposed between the light source unit and the optical member. Thus, the optical member may not be deformed and the display quality of the LCD apparatus may not be deteriorated.

BRIEF DESCRIPTION OF THE DRAWINGS

The above and other features and advantages of the invention will become more apparent by describing in detailed exemplary embodiments thereof with reference to the accompanying drawings, in which.

DESCRIPTION OF THE PREFERRED EMBODIMENTS

Hereinafter, the preferred embodiment of the present invention will be described in detail with reference to the accompanying drawings.

Light Source Assembly

Figure 1:
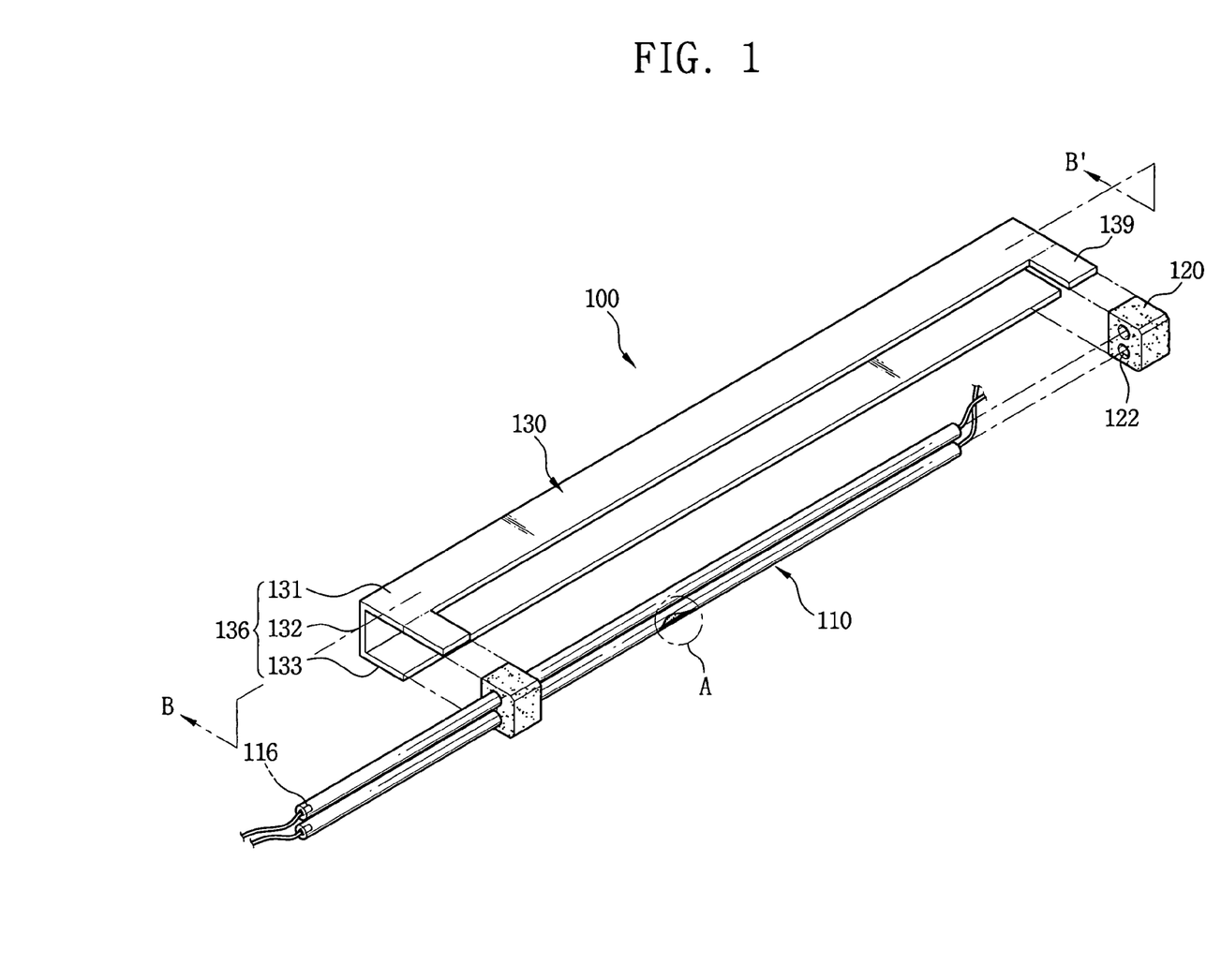
FIG. 1 is a partially cut exploded perspective view illustrating a light source assembly according to an embodiment of the present invention.
Figure 2:
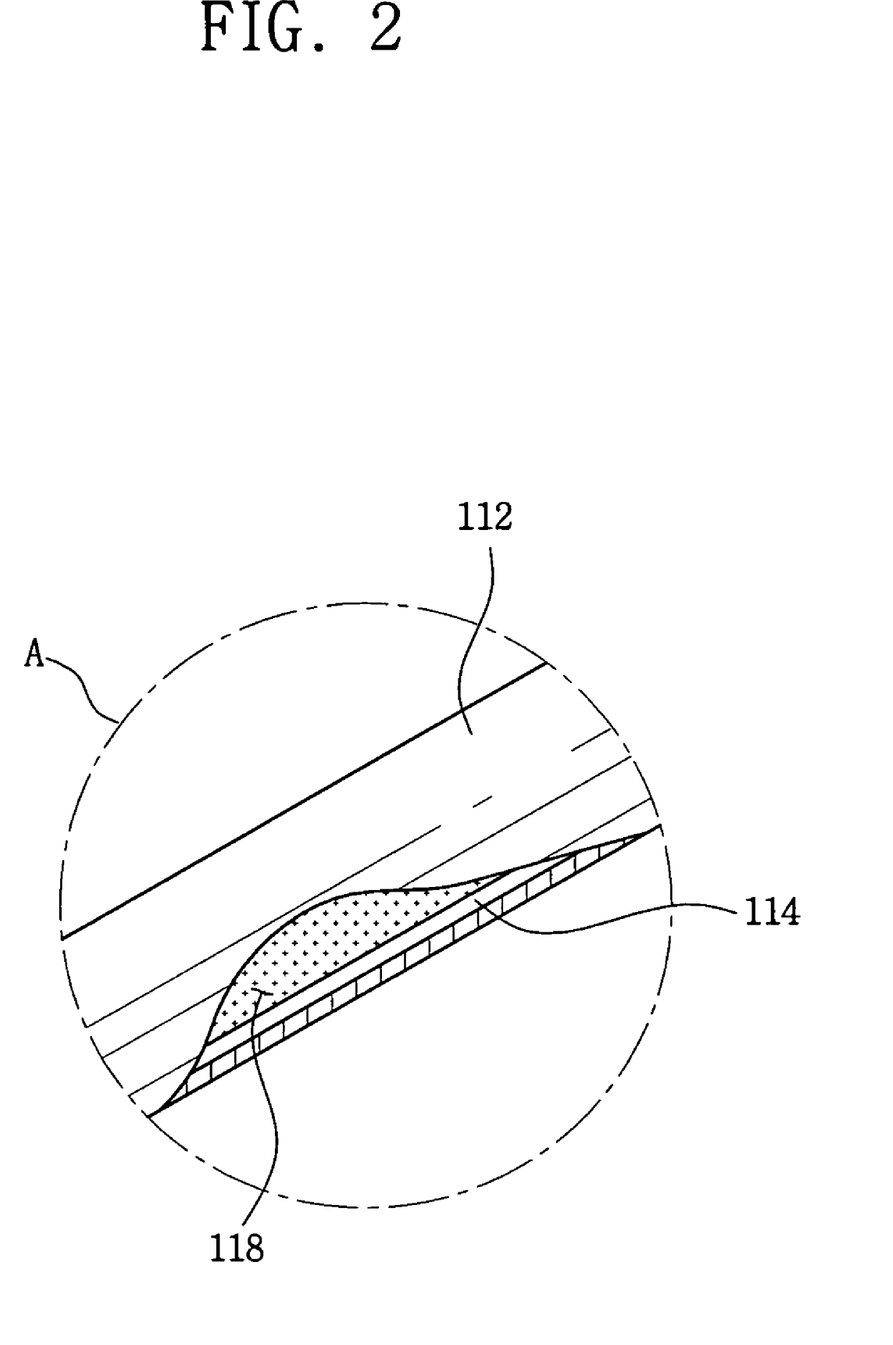
FIG. 2 is an enlarged view illustrating a portion 'A' in FIG. 1.
Figure 3:
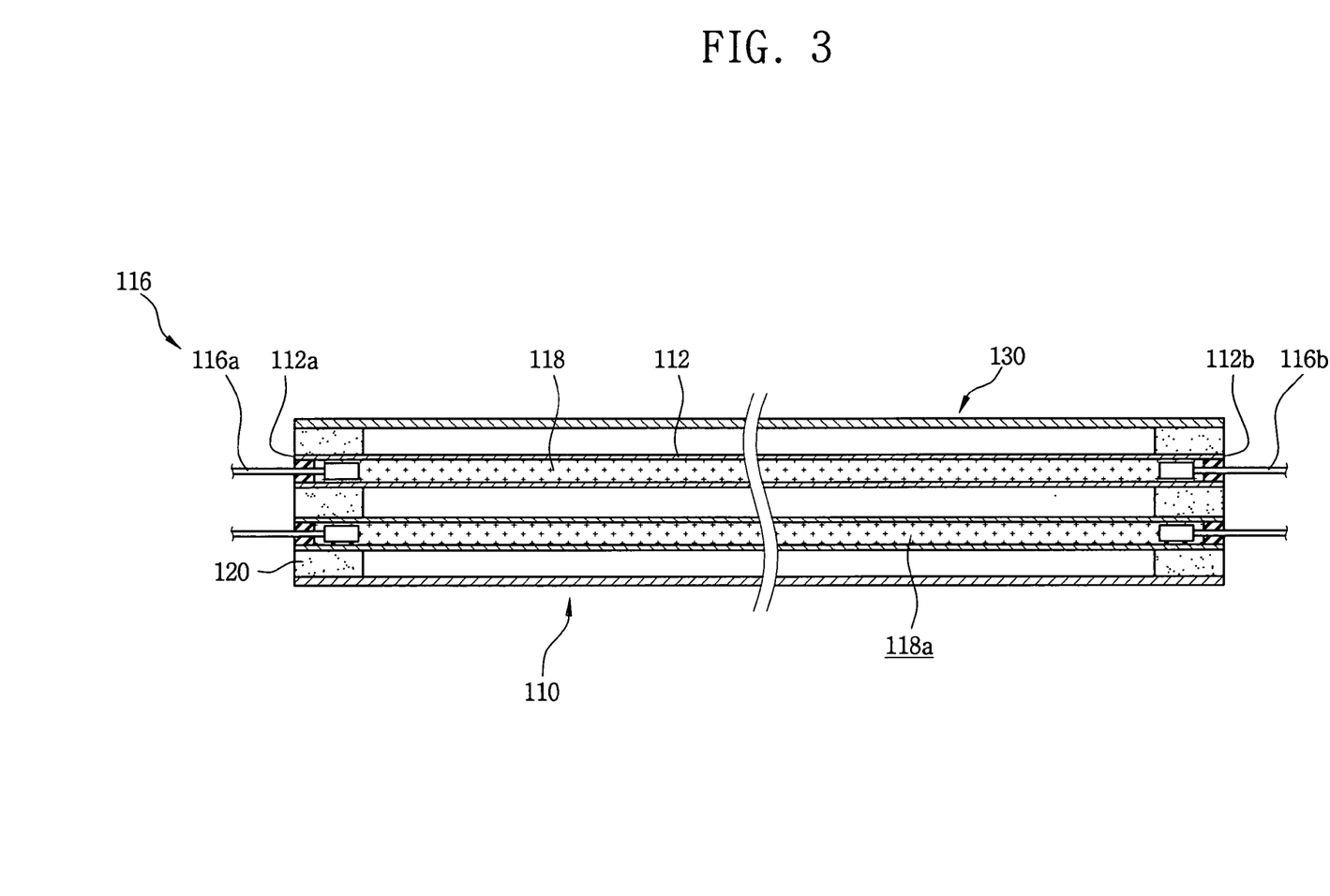
FIG. 3 is a cross-sectional view taken along a line B–B' in FIG. 1.

FIG. 1 is a partially cut exploded perspective view illustrating a light source assembly according to an embodiment of the present invention. FIG. 2 is an enlarged view illustrating a portion 'A' in FIG. 1. FIG. 3 is a cross-sectional view taken along a line B–B' in FIG. 1.

Referring to FIGS. 1 to 3, a light source assembly 100 includes a light source unit 110, a holder 120 and a reflection cover 130.

The light source unit 110 has a light source body 112, a fluorescent layer 114 and an electrode part 116.

In this embodiment, the light source body 112 has a tubular shape. The light source body 112 includes glass having high light transmittance. A discharge space 118a is formed in the light source body 112. The discharge space 118a is filled with a discharge gas 118 that generates a non-visible light through discharging.

The discharge gas 118 includes mercury (Hg), and inert gases such as argon (Ar), neon (Ne), krypton (Kr), xenon (Xe), etc. The inert gas may be used alone or in a mixture thereof. Mercury in the discharge gas 118 collides with an electron in the discharge space 118a to generate a non-visible light such as an ultraviolet light.

The fluorescent layer 114 is formed on the inner surface of the light source body 112. The fluorescent layer 114 converts the non-visible light into a visible light.

The visible light that has passed through the fluorescent layer 114 is a white light similar to sunlight. The fluorescent layer 114 includes a red fluorescent material, a green fluorescent material and a blue fluorescent material mixed to generate the white light. The red, green and blue fluorescent materials generate red visible light, green visible light and blue visible light from the non-visible light, respectively. When the red, green and blue visible lights are combined, the white light is generated.

The electrode part 116 is disposed in the light source body 112 or on a surface of the light source body 112. When the discharge voltage is applied to the electrode part 116, electrons are emitted from the electrode part 116. The electrons collide with mercury (Hg) of the discharge gas to generate a non-visible light, and the fluorescent layer 114 converts the non-visible light into a visible light. As a result, white light is generated from the surface of the light source body 112.

The electrode part 116 may be partially inserted into the light source body 112. Alternatively, the electrode part 116 may be installed on an external surface of the light source body 112. In this embodiment, a pair of electrode parts 116 is partially inserted into the light source body 112, such that the electrode parts 116 face each other. In particular, the electrode part 116 includes a first electrode 116a disposed in a first end portion 112a of the light source body 112 and a second electrode 116b disposed in a second end portion 112b of the light source body 112 corresponding to the first end portion 112a.

The holder 120 fixes the light source unit 110. The holder 120 has a rectangular parallelepiped shape, and includes a penetrating hole 122. In this embodiment, the light source assembly 100 has two holders 120. The first and second end portions 112a and 112b of the light source unit 110 are inserted into the holders 120, respectively.

The reflection cover 130 includes a reflection portion 136 and a heat intercepting portion 139.

The reflection portion 136 reflects the visible light irradiated from the surface of the light source unit 110. The collected visible light then exits in one direction through the reflection portion 136. In this embodiment, the reflection portion 136 has a first reflection portion 131, a second reflection portion 132 and a third reflection portion 133. The first reflection portion 131 has a rectangular plate shape with a length substantially same as the length of the light source unit 110. The second reflection portion 132 is extended from the longitudinal edge of the first reflection portion 131 to cover the light source unit 110. In this embodiment, the second reflection portion 132 is bent from the first reflection portion 131 by an angle of about 90°. The third reflection portion 133 is extended from the longitudinal edge of the second reflection portion 132 to cover the light source unit 110. In this embodiment, the third reflection portion 133 is bent from the second reflection portion corresponding to the first reflection portion 131 in substantially parallel.

The heat intercepting portion 139 is extended from a portion of the reflection portion 130 to cover the holder 120. When a heat is transferred from the light source unit 110 to the holder 120, the heat intercepting portion 139 rapidly transfers the heat to the reflection portion 130, thereby decreasing the temperature of the holder 120. In this embodiment, the heat intercepting portion 139 is extended from the first reflection portion 131 of the reflection portion 130. The heat intercepting portion 139 is preferably extended from the first reflection portion 131 to the position selectively covering the holder 120. The light exited from the light source unit 110 may not be blocked by the heat intercepting portion 139.

As described above, the heat intercepting portion 139 that covers the holder 120 formed is extended from the reflection portion 130 of the light source unit assembly 100. The heat transferred to the holder 120 is externally emitted while the light exited from the light source unit 110 is not blocked. Thus, the temperature of the holder 120 is lowered and other optical members adjacent to the holder 120 may not be damaged.

Figure 4:
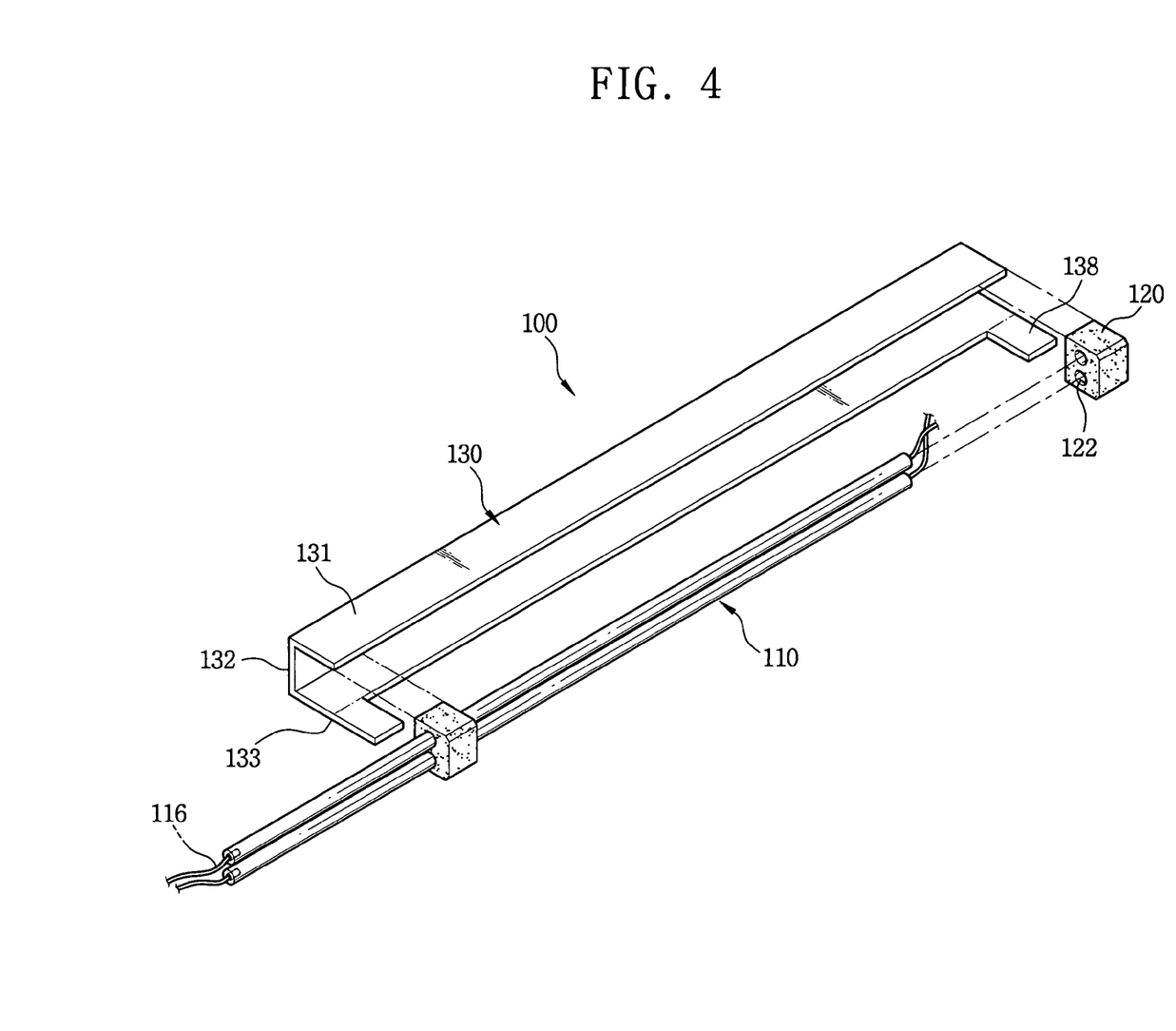
FIG. 4 is an exploded perspective view illustrating a light source assembly according to another embodiment of the present invention.

FIG. 4 is a partially cut exploded perspective view illustrating a light source assembly according to another embodiment of the present invention. In this embodiment, all other elements are substantially identical to those in FIGS. 1 to 3 except for the position of the heat intercepting portion. Like reference numerals identify identical elements in FIG. 4, and detailed descriptions about the identical elements will be omitted.

Referring to FIG. 4, a heat intercepting portion 138 is extended from a third reflection portion 133 of a reflection portion 130. The heat interception portion 138 is extended to the position corresponding to a holder 120. The extended heat intercepting portion 138 is bent from the third reflection portion 133 corresponding to the holder 120 in substantially parallel. The heat intercepting portion 138 emits the heat transferred to the holder 120, thereby decreasing the temperature of the holder 120 and reducing damage of other optical members adjacent to the holder 120.

As described above, the heat intercepting portion 138 that covers the holder 120 formed is extended from the reflection portion 130 of the light source unit assembly 100. The heat transferred to the holder 120 is externally emitted while the light exited from the light source unit 110 is not blocked. Thus, the temperature of the holder 120 is lowered and other optical members adjacent to the holder 120 may not be damaged.

Backlight Assembly

Figure 5A:
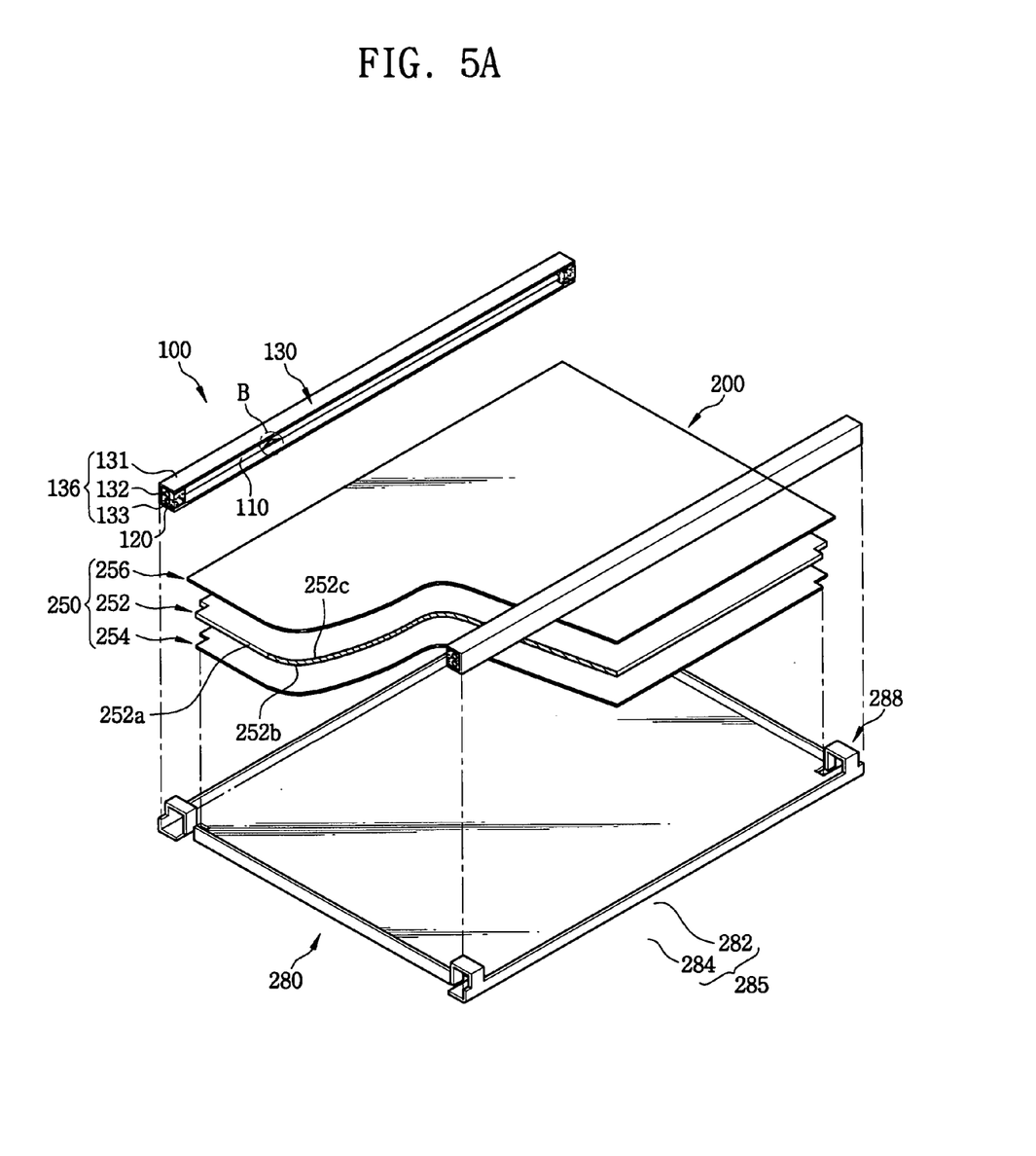
FIG. 5A is a partially cut exploded perspective view illustrating a backlight assembly according to an embodiment of the present invention.
Figure 5B:
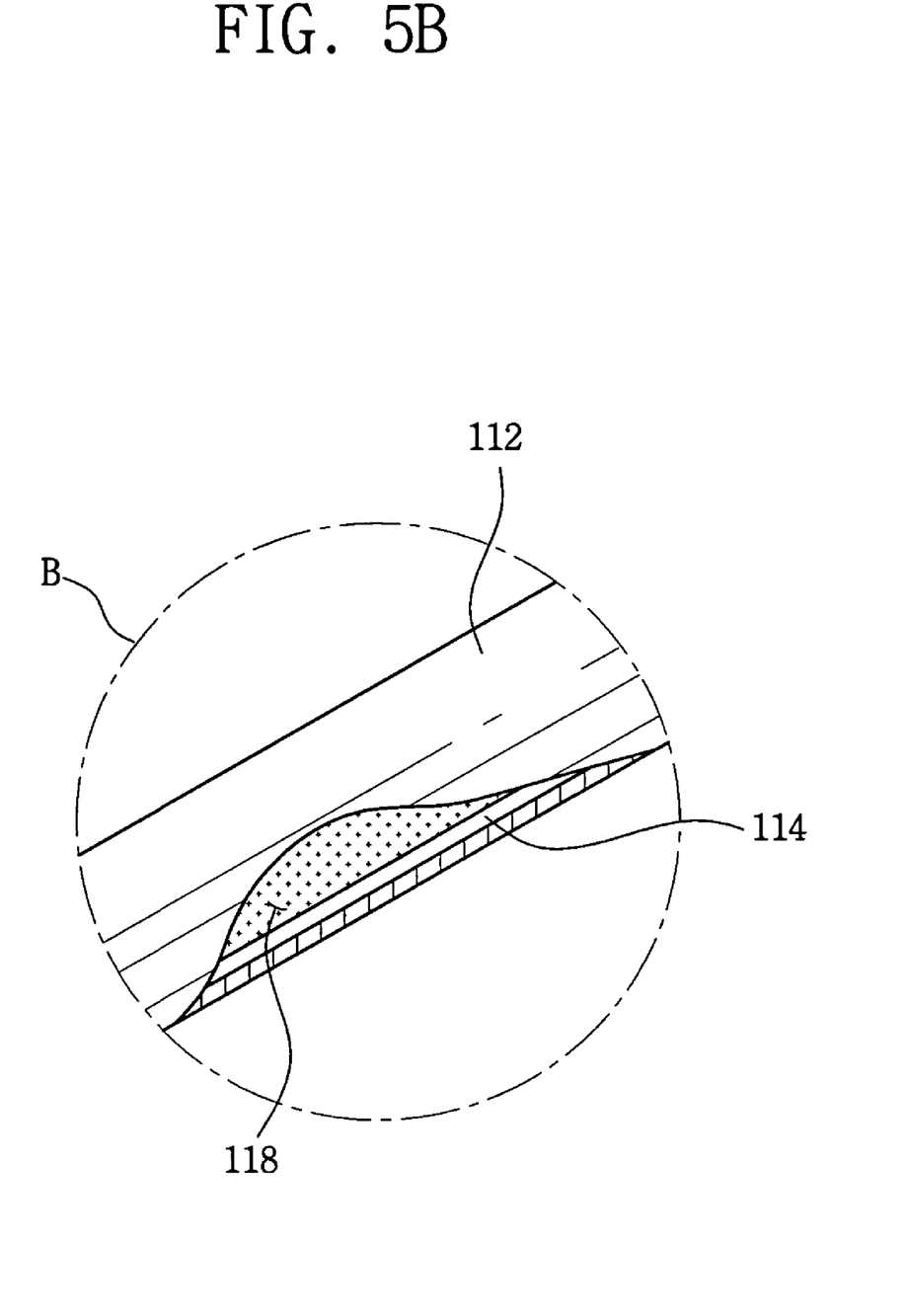
FIG. 5B is an enlarged view illustrating a portion 'B' in FIG. 5A.
Figure 6:
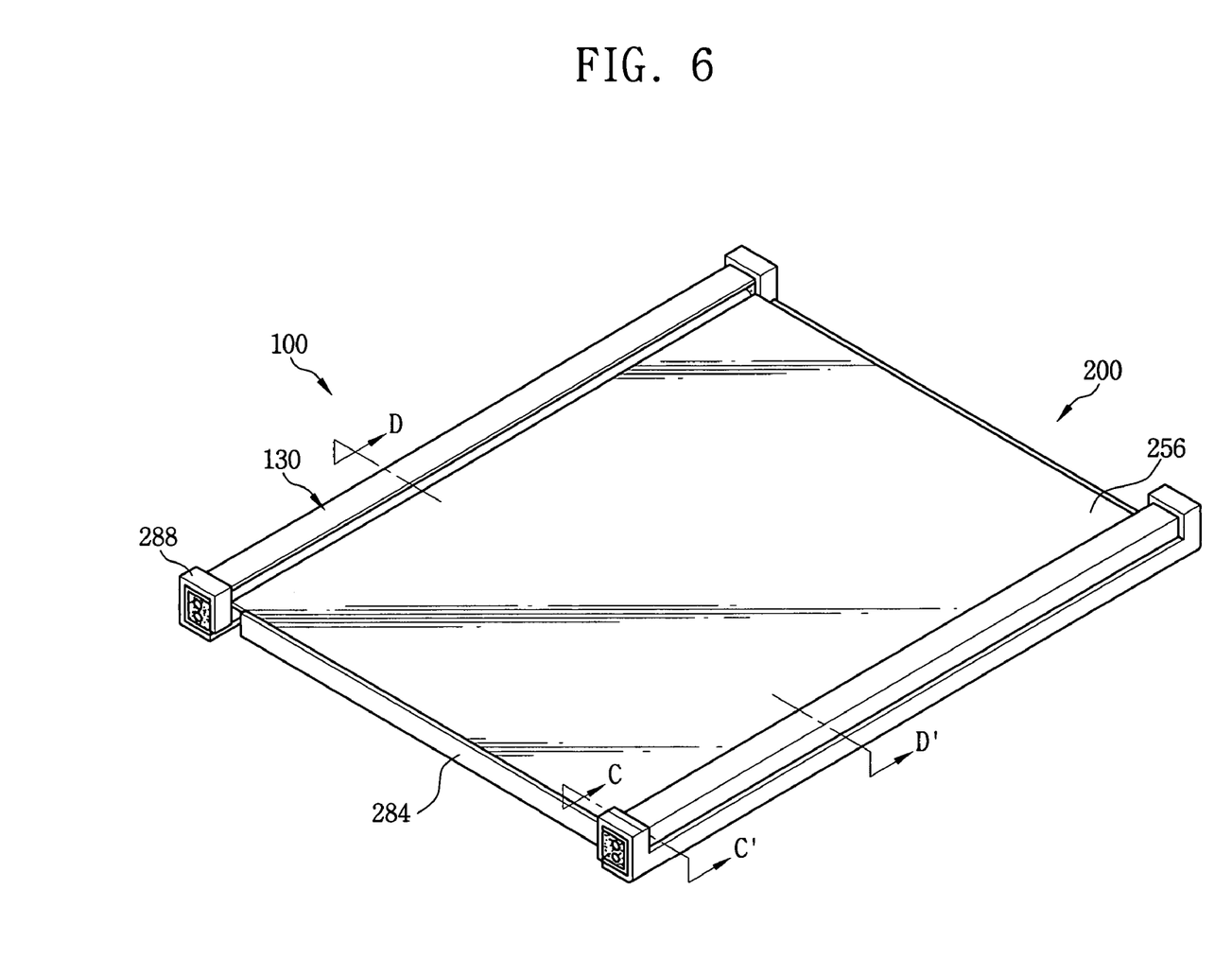
FIG. 6 is a perspective view illustrating the backlight assembly in FIG. 5A.
Figure 7:
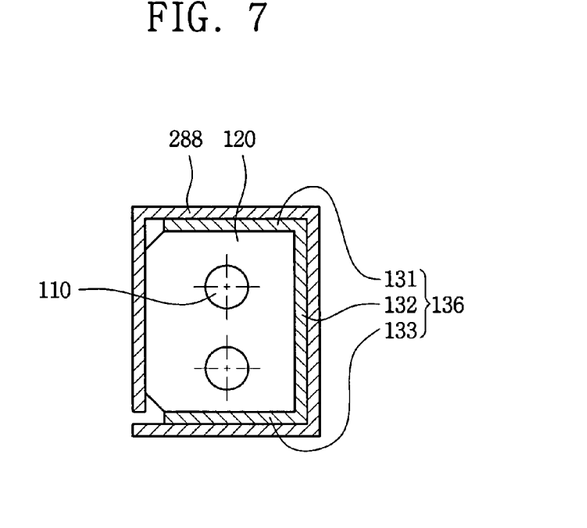
FIG. 7 is a cross-sectional view taken along a line C–C' in FIG. 6.
Figure 8:
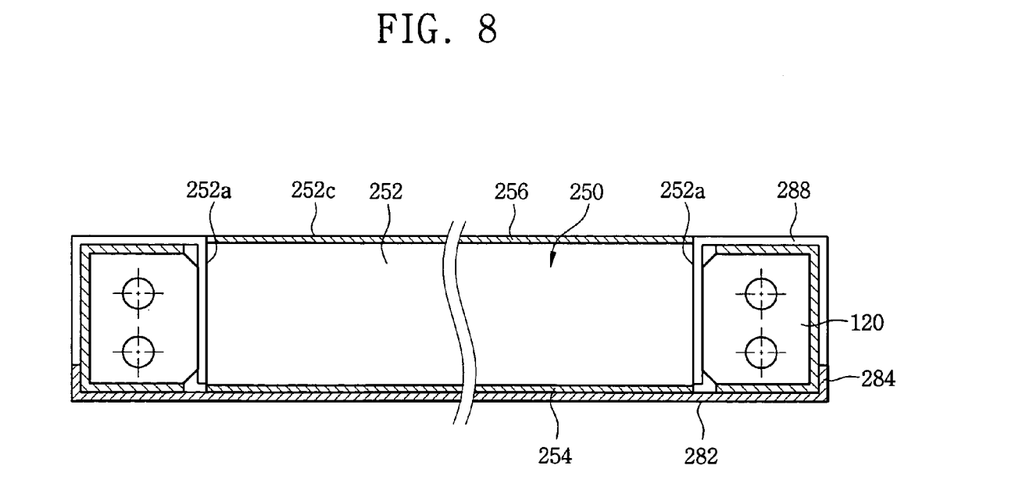
FIG. 8 is a cross-sectional view taken along a line D–D' in FIG. 6.

FIG. 5A is a partially cut exploded perspective view illustrating a backlight assembly according to an embodiment of the present invention. FIG. 5B is an enlarged view illustrating 'B' in FIG. 5A. FIG. 6 is a perspective view illustrating the backlight assembly in FIG. 5A. FIG. 7 is a cross-sectional view taken along a line C–C' of FIG. 6. FIG. 8 is a cross-sectional view taken along a line D–D' in FIG. 6.

Referring to FIGS. 5A to 8, a backlight assembly 200 includes a light source assembly 100, an optical member 250 and a first receiving container 280.

The light source assembly 100 has a light source unit 110, a holder 120 and a reflection cover 130.

The light source unit 110 has a light source body 112, a fluorescent layer 114 and an electrode part 116.

A discharge space 118a is formed in the light source body 112. The discharge space 118a is filled with a discharge gas 118 that generates a non-visible light by discharging.

The fluorescent layer 114 is formed on an inner surface of the light source body 112. The fluorescent layer 114 converts the non-visible light into a visible light. The fluorescent layer 114 includes a red fluorescent material, a green fluorescent material and a blue fluorescent material mixed in equivalent amounts.

The electrode part 116 is disposed in the light source body 112. When a discharge voltage is applied to the electrode part 116, electrons are emitted from the electrode part 116. Then, the electrons collide with mercury (Hg) of the discharge gas to generate a non-visible light, and the fluorescent layer 114 converts the non-visible light into a visible light. As a result, white light is generated from the surface of the light source body 112.

The holder 120 fixes the light source unit 110 in a specific position. The holder 120 has a rectangular plate shape, and includes a penetrating hole 122. In this embodiment, the light source assembly 100 has two holders 120. Two holders 120 are inserted into two end portions of the light source unit 110, respectively.

The reflection cover 130 has a plurality of reflection portions 136. The reflection portion 136 collects the visible light irradiated from the surface of the light source unit 110. The collected visible light then exits in one direction through the reflection portion 136. In this embodiment, the reflection portion 136 has a first reflection portion 131, a second reflection portion 132 and a third reflection portion 133. The first reflection portion 131 has a rectangular parallelepiped shape with a length substantially identical to the length of the light source unit 110. The second reflection portion 132 is extended from the longitudinal edge of the first reflection portion 131 to cover the light source unit 110. In this embodiment, the second reflection portion 132 is bent from the first reflection portion 131 by an angle of about 90°. The third reflection portion 133 is extended from the longitudinal edge of the second reflection portion 132 to cover the light source unit 110. In this embodiment, the third reflection portion 133 is bent from the second reflection portion corresponding to the first reflection portion 131 in substantially parallel.

The optical member 250 is disposed in substantially parallel with the light source assembly. The optical member 250 receives the exited light and changes the optical distribution of the visible light emitted from the light source unit 110. The optical distribution of the visible light emitted from the light source unit 110 becomes more uniform by the optical member 250.

In this embodiment, the optical member 250 includes a light guide plate 252. The light guide plate 252 has a side face 252a, a light reflection face 252b and a light exiting face 252c. The side face 252a has a light incident face where the visible light emitted from the light source unit 110 enters, and the light reflection face 252b reflects the visible light passing through the light incident face. The light exiting face 252c corresponding to the light reflection face exits the visible light.

The optical member 250 may further include optical sheets 254 and 256. The optical sheets 254 and 256 may correspond to a diffusion sheet 256 and a reflection plate 254.

The first receiving container 280 may include aluminum or aluminum alloy to reduce deformation of the first receiving container 280 by an external impact and to emit the heat generated in the light source unit 110. The first receiving container 280 includes a receiving body 285 and a light emission portion 288.

The receiving body 285 includes a first bottom plate 282 and a first sidewall 284. In this embodiment, the shape and area of the first bottom plate 282 is adjusted to receive the light source assembly 100 and the optical member 250. The first sidewall 284 is extended from edges of the bottom plate 282 to form a receiving space. The light source assembly 100 and the optical member 250 may be fixed on the bottom plate 282 by the first sidewall 284.

The light emission portion 288 is interposed between the optical member 250 and the holder 120 of the light source assembly 100 on the receiving body 285. The heat generated in the light source assembly 100 may not be transferred to the optical member 250 by the light emission portion 288. Thus, thermal damage of the optical member 250 may be prevented.

In this embodiment, the light emission portion 288 is extended from the first sidewall 284 of the receiving body 285 substantially parallelly in a direction corresponding to the bottom plate 282 of the receiving body 285 to be interposed between the holder 120 and the optical member 250. The heat intercepting portion 288 extended from the first sidewall 284 covers the reflection portion 136 of the light source assembly 100. In particular, the heat intercepting portion 288 covers the second reflection portion 132 and the third reflection portion 133. The heat intercepting portion 288 that covers the second reflection portion 132 and the third reflection portion 133 is also bent between the holder 120 and the optical member 250 to be interposed between the holder 120 and the optical member 250. The heat intercepting portion 288 is interposed between the holder 120 and the side face 252i a of the light guide plate 250 that is in contact with the holder 120.

As described above, the heat intercepting portion 288 is formed on the first receiving container 280 to be interposed between the holder 120 and the optical member 250. The heat transferred from the light source unit 110 to the holder 120 may not be directly transferred to the optical member 250. Thus, deformation or damage of the optical member 250 may be prevented.

Figure 9:
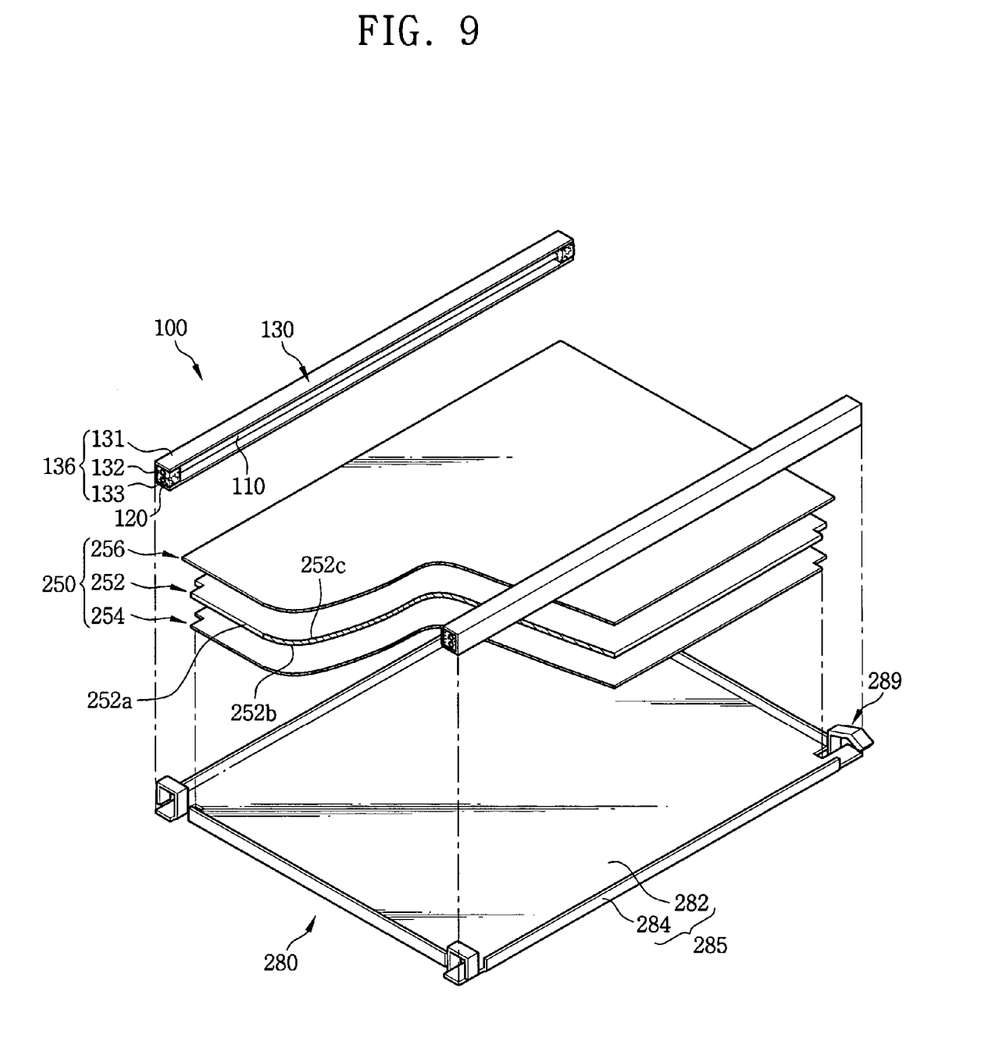
FIG. 9 is a partially cut exploded perspective view illustrating a backlight assembly according to another embodiment of the present invention.
Figure 10:
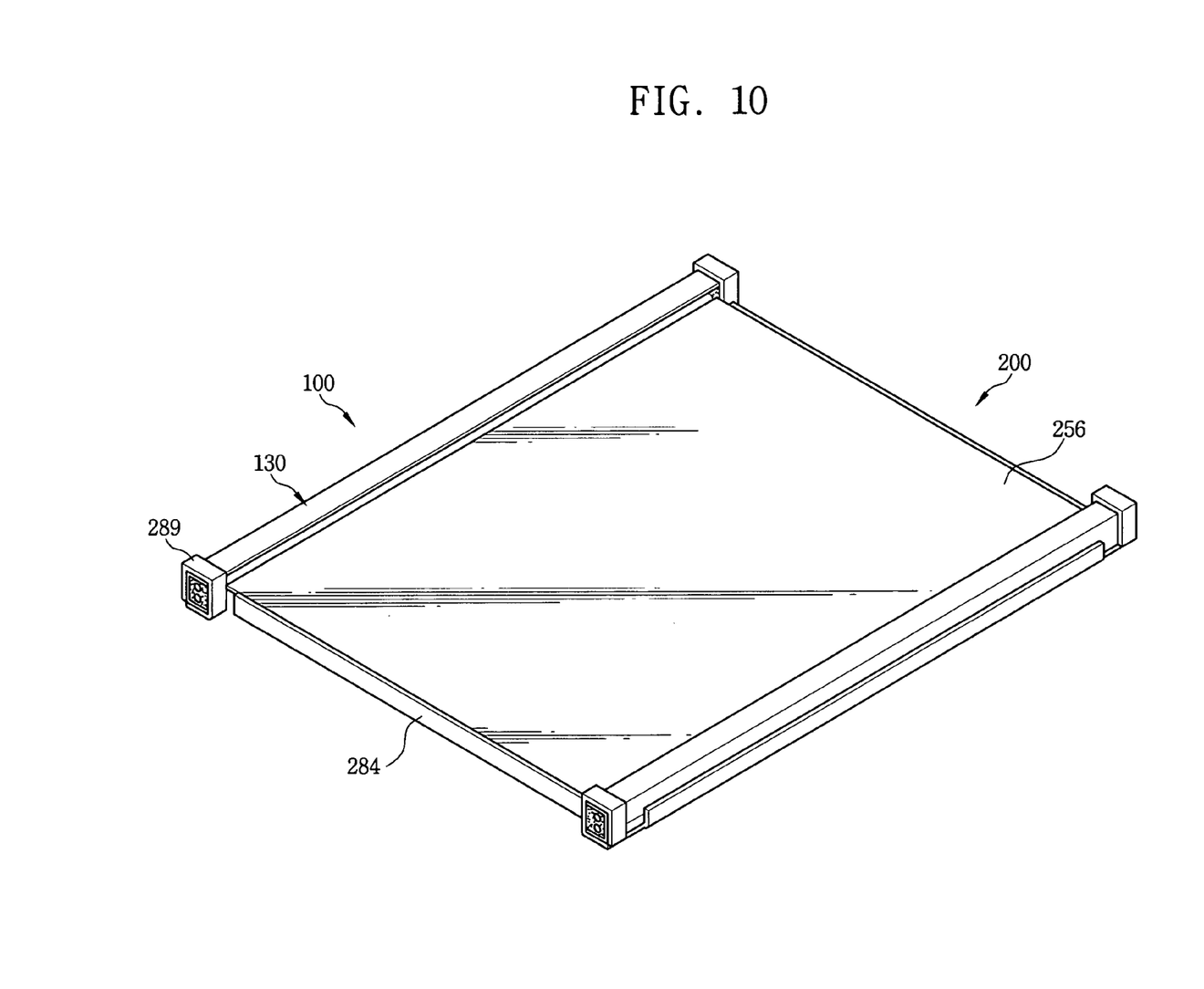
FIG. 10 is a perspective view illustrating the backlight assembly in FIG. 9.

FIG. 9 is a partially cut exploded perspective view illustrating a backlight assembly according to another embodiment of the present invention. FIG. 10 is a perspective view illustrating the backlight assembly in FIG. 9. Like reference numerals identify identical elements in FIGS. 5A to 8, and detailed descriptions about the identical elements will be omitted.

Referring to FIGS. 9 and 10, a heat intercepting portion 289 is extended from a first bottom plate 282 of a first receiving container 280. A portion of a first bottom plate 282 of the first receiving container 280 is cut and the heat intercepting portion 289 is inserted into the cut portion. The heat intercepting portion 289 is bent and then covers the holder 120.

In this embodiment, the heat interception portion 289 is interposed between the holder 120 and the optical member 250. Since the heat intercepting portion 289 is interposed between the holder 120 and the optical member 250, the heat transferred to the holder 120 of the light source assembly 100 is transferred to the first bottom plate 282 of the first receiving container 280 and then emitted on the first bottom plate 282. The heat intercepting portion 289 that is bent between the holder 120 and the optical member 250 also prevents the light source assembly 100 from moving in the first receiving container 280.

Alternatively, the heat intercepting portion 289 may be bent to sequentially cover the holder 120 corresponding to the optical member 250, the first reflection portion 131 and the second reflection portion 132 of the light source assembly 100. Since the heat intercepting portion 289 covers the holder 120, the first reflection portion 131 and the second reflection portion 132, heat interception area may be enhanced, thereby decreasing the surface temperature of the holder 120.

Figure 11:
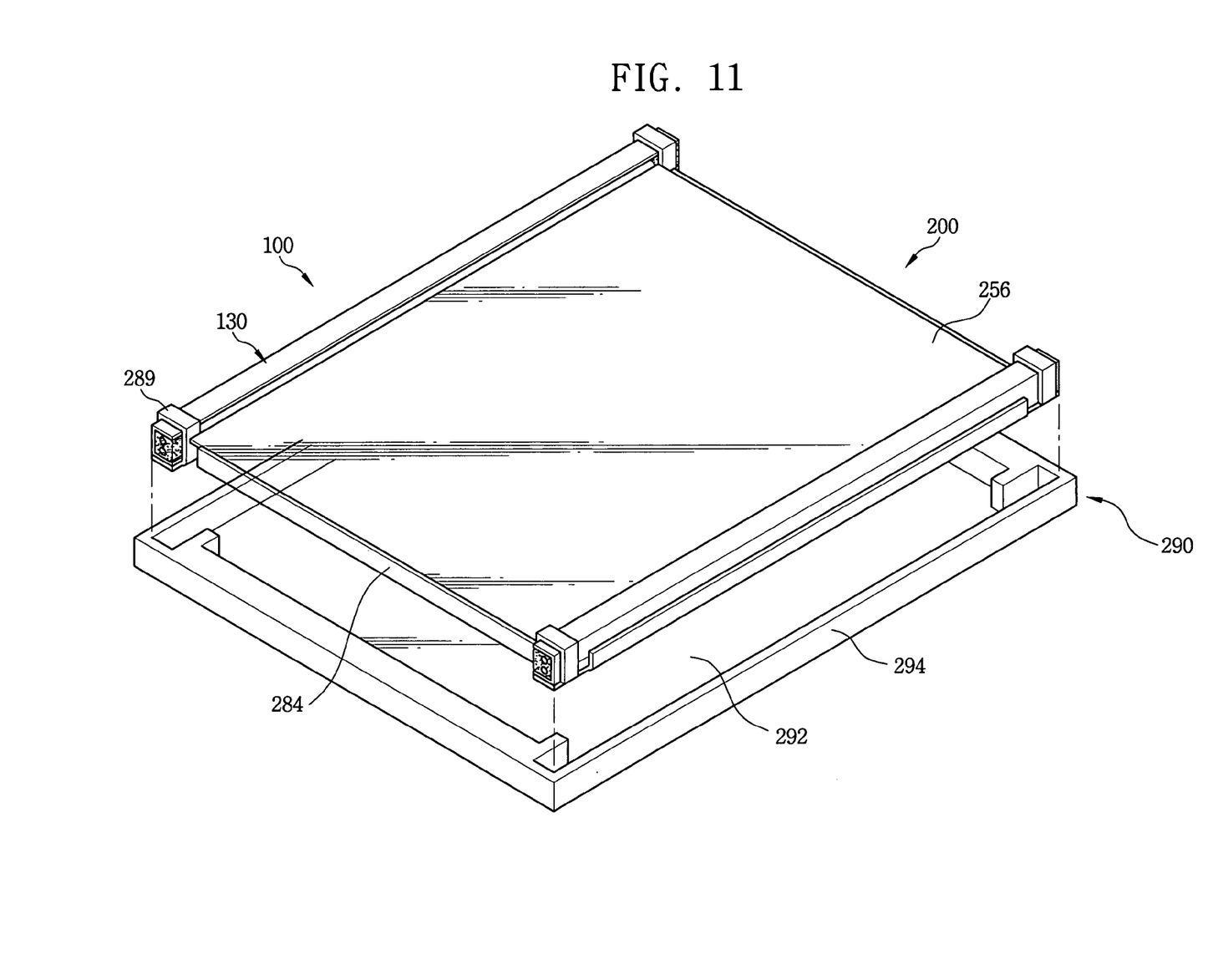
FIG. 11 is a partially cut exploded perspective view illustrating a backlight assembly according to still another embodiment of the present invention.

FIG. 11 is a partially cut exploded perspective view illustrating a backlight assembly according to still another embodiment of the present invention. In this embodiment, all other elements are substantially identical to those in FIGS. 9 to 10 except for a second receiving container. Like reference numerals identify identical elements in FIG. 11, and detailed descriptions about the identical elements will be omitted.

Referring to FIG. 11, the second receiving container 290 receives a first receiving container 280. The second receiving container 290 includes an insulating material such as a synthetic resin that has a higher insulating property than the first receiving container 280. The second receiving container 290 absorbs an impact provided to the first receiving container 280 to maintain the shape of the first receiving container 280. In addition, the second receiving container 290 prevents the light source assembly 100 from being detached from the light emission portion 289 in the first receiving container 280.

The second receiving container 290 includes a second bottom plate 292 and a second sidewall 294. The second bottom plate 292 has a sufficient area to contain the first bottom plate 282 of the first receiving container 280. The second sidewall 294 has a sufficient height to prevent the first receiving container 280 from detachment.

As described above the second receiving container 290 contains the first receiving container 280 having the heat intercepting portion 289. Thus, the first receiving container 280 may not be deformed or damaged by external impact.

In this embodiment, the backlight assembly has a structure substantially identical to that of the backlight assembly in FIGS. 9 and 10 except for the second receiving container. The backlight assembly according to this embodiment may also be substantially identical to that of FIGS. 5A to 8.

Liquid Crystal Display Apparatus

Figure 12:
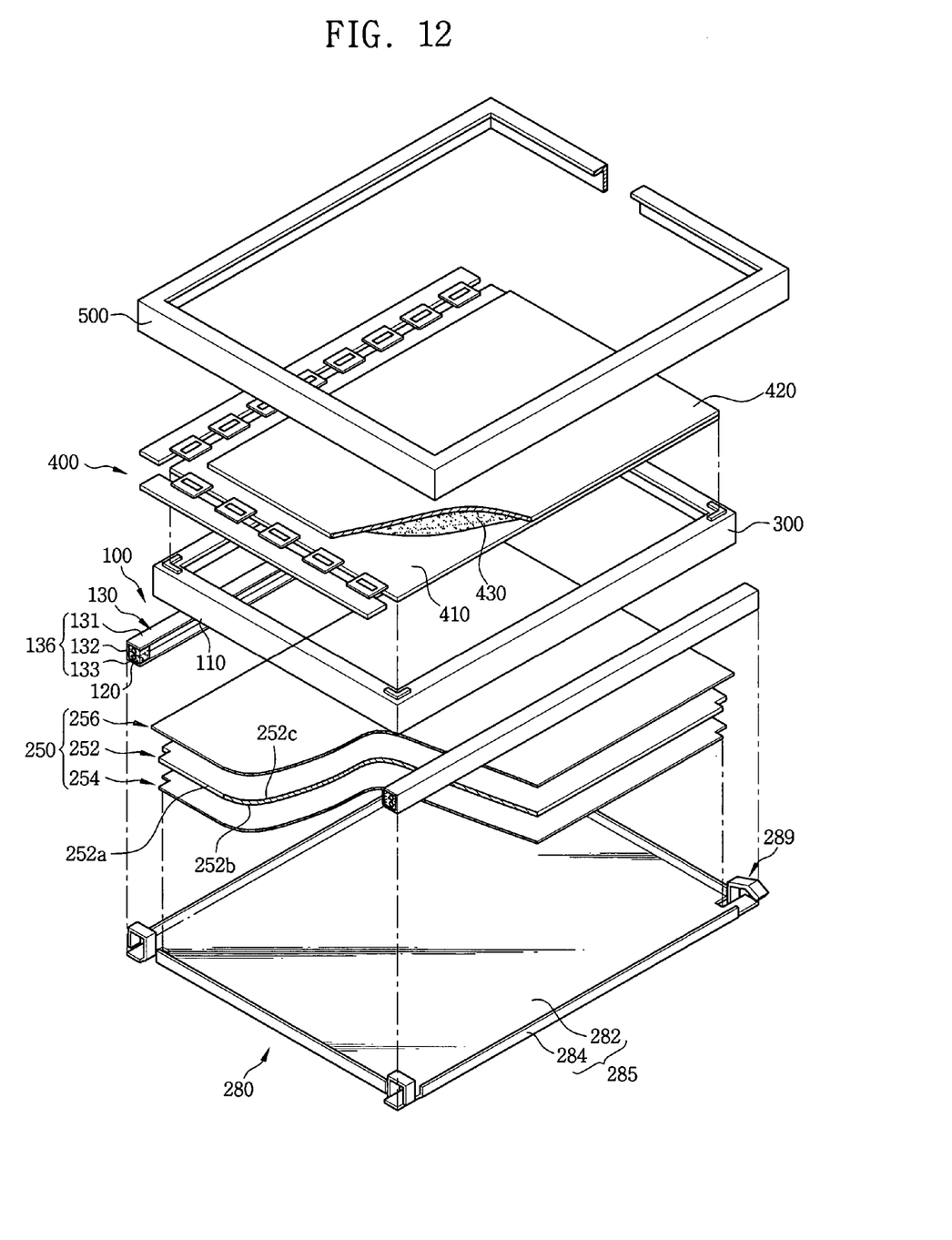
FIG. 12 is a partially cut exploded perspective view illustrating a liquid crystal display apparatus according to an embodiment of the present invention.

FIG. 12 is a partially cut exploded perspective view illustrating a liquid crystal display apparatus according to an embodiment of the present invention. In this embodiment, the backlight assembly is substantially identical to those in FIGS. 9 to 10. Like reference numerals identify identical elements in FIG. 12, and detailed descriptions about the identical elements will be omitted.

Referring to FIG. 12, a liquid crystal display apparatus 600 includes a backlight assembly 200, a middle chassis 300, a liquid crystal display panel 400 and a top chassis 500.

The middle chassis 300 is disposed on a first receiving container 280. The middle chassis 300 fixes the liquid crystal display panel 400 in the backlight assembly 200.

The liquid crystal display panel 400 converts the light from the light source unit 100 into an image including information. For this, the liquid crystal display panel 400 includes a thin film transistor substrate 410, a liquid crystal layer 430 and a color filter substrate 420.

The thin film transistor substrate 410 has a pixel electrode formed in a matrix shape, a thin film transistor that applies an operation voltage to the pixel electrode, a gate line and a data line.

The color filter substrate 420 has a color filter corresponding to the pixel electrode on the thin film transistor substrate 410, and a common electrode formed on the color filter.

The liquid crystal layer 430 is interposed between the thin film transistor substrate 410 and the color filter substrate 420.

The top chassis 500 covers edges of the liquid crystal display panel 400. A portion of the top chassis 500 is connected to the first receiving container 280 of the backlight assembly 200 by hook. The top chassis 500 protects the liquid crystal display panel 400 from an external impact, and prevents detachment of the liquid crystal display panel 400 from the backlight assembly 200.

In this embodiment, the backlight assembly has a structure substantially identical to that of the backlight assembly in FIGS. 9 and 10 except for the second receiving container. The backlight assembly according to this embodiment may also be substantially identical to that of FIGS. 5A to 8.

As described above, a heat intercepting portion is interposed between a light source unit and an optical member. Thus, the heat generated in the light source unit may not be directly transferred to the optical member in contact with the light source unit. In addition, the optical member may not be deformed by the heat generated in the light source unit.

Having described the exemplary embodiments of the invention and its advantages, it is noted that various changes, substitutions and alterations can be made herein without departing from the spirit and scope of the invention as defined by appended claims.

What is claimed is:

1. A light source assembly comprising:
    a light source unit including a light source body, a fluorescent layer and an electrode part, the light source body having a discharge space that contains a discharge gas to generate a non-visible light, the fluorescent layer being formed on an inner surface of the light source body and converting the non-visible light into a visible light, a discharge voltage being applied to the electrode part;
    a holder that fixes the light source unit; and
    a reflection cover including a reflection portion that reflects the visible light and a heat intercepting portion thermally connected to the reflection portion, the heat intercepting portion intercepting heat of the holder to transfer the heat to the reflection cover that emits the heat,
    wherein the reflection portion comprises:
    a first reflection portion;
    a second reflection portion bent from the first reflection portion to cover the light source unit; and
    a third reflection portion bent from the second reflection portion to correspond substantially parallel to the first reflection portion, and
    wherein the heat intercepting portion wraps around all of the reflection portions.

2. The light source assembly of claim 1, wherein the electrode part comprises first and second electrodes, the first electrode being disposed at a first end portion of the light source body, the second electrode being disposed at a second end portion of the light source body corresponding to the first end portion.

3. The light source assembly of claim 1, wherein the heat intercepting portion is extended from the first reflection portion.

4. The light source assembly of claim 1, wherein the heat intercepting portion is extended from the third reflection portion.

5. A backlight assembly comprising:
    a light source assembly including a light source unit, a balder and a reflection cover, the light source unit generating a light, the holder fixing the light source unit, the reflection cover covering the light source unit and the holder to reflect a light irradiated from the light source unit;
    an optical member disposed in substantially parallel with the light source assembly, the optical member receiving the light and enhancing optical properties of the light; and
    a first container including a receiving body and a heat intercepting portion, the receiving body receiving the light source assembly and the optical member, the heat intercepting portion being extended from the receiving body and interposed between the holder and the optical member,
    wherein the receiving body comprises a bottom plate and a sidewall, the sidewall being extended from edges of the bottom plate.

6. The backlight assembly of claim 5, wherein the heat intercepting portion is extended from the sidewall of the receiving body substantially parallel in a direction corresponding to the bottom plate of the receiving body to be interposed between the holder and the optical member.

7. The backlight assembly of claim 5, wherein the heat intercepting portion is divided from the bottom plate to be disposed between the holder and the optical member.

8. The backlight assembly of claim 5, wherein the first receiving container comprises aluminum or aluminum alloy.

9. The backlight assembly of claim 5, wherein the first receiving container is contained in a second receiving container.

10. The backlight assembly of claim 9, wherein the second receiving container comprises a synthetic resin.

11. The backlight assembly of claim 5, wherein the optical member includes a light guide plate having a light incident face, a light reflection face and a light exiting face, the light enters to the light incident face, the light reflection face reflects the light that enters the light guide plate through the light incident face, and the light exiting face corresponds to the light reflection face.

12. The backlight assembly of claim 11, wherein the optical member further comprises an optical sheet disposed on the light exiting face.

13. A liquid crystal display apparatus comprising:

a light source assembly including a light source unit, a holder and a reflection cover, the light source unit generating a light, the holder fixing the light source unit, the reflection cover covering the light source unit and the holder to collect a light irradiated from the light source unit and to exit the collected light;

an optical member disposed in substantially parallel with the light source assembly, the optical member receiving the exited light and changing an optical distribution of the light;

a first container including a receiving body and a heat intercepting portion, the receiving body receiving the light source assembly and the optical member, the heat intercepting portion being extended from the receiving body and interposed between the holder and the optical member; and a liquid crystal display panel disposed in the first receiving container, the liquid crystal display panel converting the light into an image including information, wherein the receiving body comprises a bottom plate and a sidewall, the sidewall being extended from edges of the bottom plate.

14. The liquid crystal display apparatus of claim 13, wherein the heat intercepting portion is extended from the sidewall of the receiving body substantially parallel in a direction corresponding to the bottom plate of the receiving body to be interposed between the holder and the optical member.

15. The liquid crystal display apparatus of claim 13, wherein a portion of the bottom plate of the first receiving container is cut and the heat intercepting portion is inserted into the cut portion.

16. The liquid crystal display apparatus of claim 13, wherein the first receiving container is contained in a second receiving container.

* * * * *